United States Patent [19]
Astheimer

[11] 3,756,726
[45] Sept. 4, 1973

[54] SPECTRAL ANALYSIS UTILIZING A BEAM-SWITCHING OPTICAL SYSTEM

[75] Inventor: Robert W. Astheimer, Westport, Conn.

[73] Assignee: Barnes Engineering Company, Stamford, Conn.

[22] Filed: Mar. 29, 1971

[21] Appl. No.: 128,786

[52] U.S. Cl. .................. 356/205, 350/166, 356/188
[51] Int. Cl. ........................................... G01n 21/22
[58] Field of Search ...................... 356/205, 188, 89, 356/178; 350/166; 250/226

[56] References Cited
UNITED STATES PATENTS

| | | | |
|---|---|---|---|
| 2,941,444 | 6/1960 | Frykman | 350/166 X |
| 3,459,951 | 8/1969 | Howarth et al. | 356/188 X |
| 3,089,382 | 5/1963 | Hecht et al. | 356/188 X |
| 3,222,978 | 12/1965 | Dreyfus | 356/188 X |
| 2,834,246 | 5/1958 | Foskett et al. | 356/188 |
| 3,435,209 | 3/1969 | Keahl | 356/188 X |
| 3,449,050 | 6/1969 | Keahl | 356/89 |

Primary Examiner—William L. Sikes
Assistant Examiner—J. Rothenberg
Attorney—Joseph Levinson and Robert Ames Norton

[57] ABSTRACT

A beam-switching optical system receives radiation from a source which is passed through a sample cell containing matter to be analyzed. The system is comprised of four small fixed mirrors, a narrow band pass interference filter, and a mirrored radiation chopper having an odd number of alternating reflecting and open sectors. The small fixed mirrors are arranged in cooperating reflecting pairs with the interference filter and chopper positioned therebetween, such that the rotation of the radiation chopper alternately directs the radiation through the interference filter at two different angles of incidence. This switching of the incidence angle shifts the band pass of the interference filter to provide radiation in two spectral regions. The output of the beam switching optical system is applied to a detector producing an AC signal which is the measure of the slope of the transmission curve of the filter. The amplitude of the signal which is synchronously demodulated constitutes an indication of the magnitude of the constituent of the sample being analyzed.

4 Claims, 3 Drawing Figures

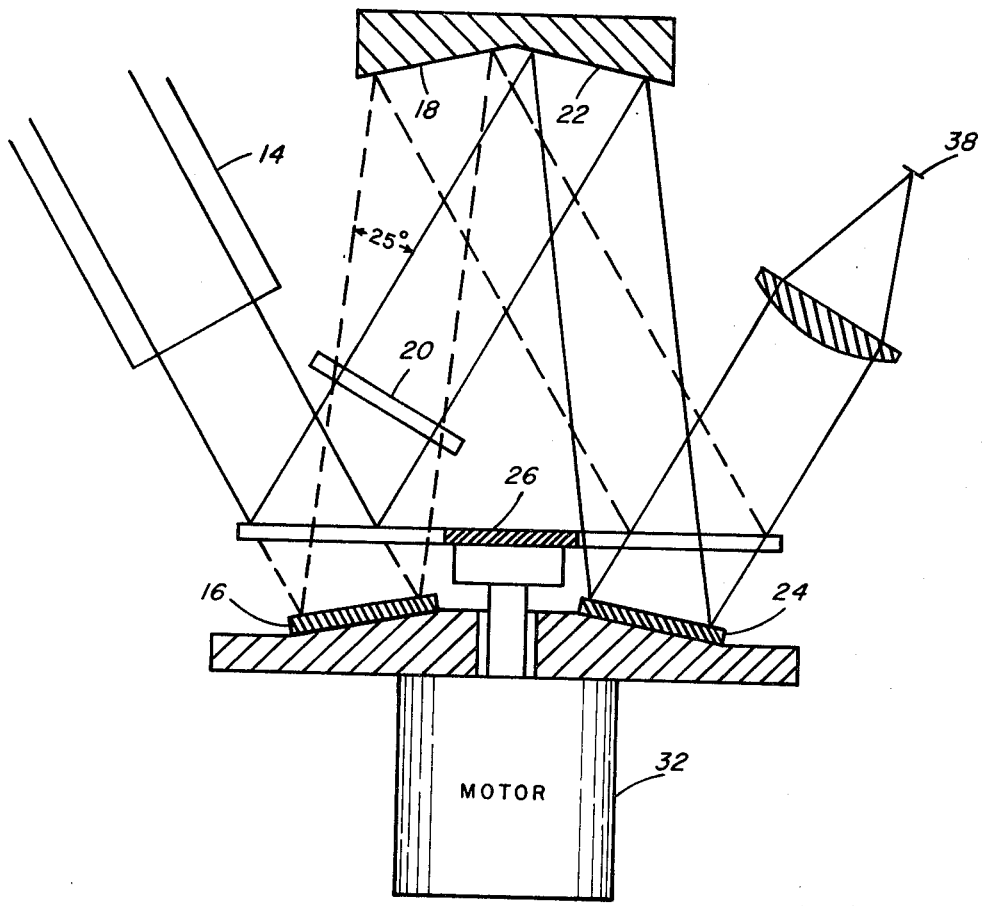

SPECTRAL ANALYSIS UTILIZING A BEAM-SWITCHING OPTICAL SYSTEM

BACKGROUND OF THE INVENTION

This invention relates to an instrument for the spectral analysis of materials, and more particularly to a beam switching optical system for monitoring the slope of a transmission curve in two spectral regions to determine the constituent of a sample being analyzed.

Increasing interest in the preservation of the environment has heightened the need for new instruments and techniques to determine the amount of pollution in the air and water so that it can be monitored and controlled. Many of the instruments now utilized are costly, lack mobility, and are too complex for application outside the laboratory.

It is an object of the present invention to provide an instrument for the spectral analysis of solids, gases, liquids, or plastics which provides a new approach to the problem and overcomes some of the aforesaid problems.

A further object of this invention is to provide a new and novel beam-switching optical system for spectral analysis in which the field of view of the radiation does not change, and the optical path length remains constant with an equal number of reflections in each path.

Another object of this invention is to provide a new and novel beam switching optical system for spectral analysis in two spectral bands which avoids elaborate gear trains, multiple phase choppers, or oscillating mechanisms.

A further object of this invention is to provide a new and novel beam-switching optical system for spectral analysis in two spectral bands using a single filter which can be adjusted to give the desired spectral location and separation of the two bands.

SUMMARY OF THE INVENTION

In carrying out this invention in one illustrative embodiment thereof, the band pass of a narrow band interference filter is shifted by changing the angle of incidence of radiation applied to the filter. This is achieved by an optical beam-switching system which applies radiation through a sample cell containing the material to be analyzed in two different optical paths through the filter and onto a detector sensitive to the radiation which is passed. The beam switching is accomplished by a mirrored optical chopper having an odd number of alternating reflecting and open sectors. By switching the angle of incidence of the radiation on the filter, the fundamental component of the resulting AC signal on the detector is a measure of the slope of the transmission curve, the amplitude of which provides the quantity of the constituent in the sample being analyzed.

BRIEF DESCRIPTION OF THE DRAWINGS

FIG. 3 is an optical schematic diagram of an alternative embodiment of this invention.

DESCRIPTION OF THE PREFERRED EMBODIMENTS

Figure 1:
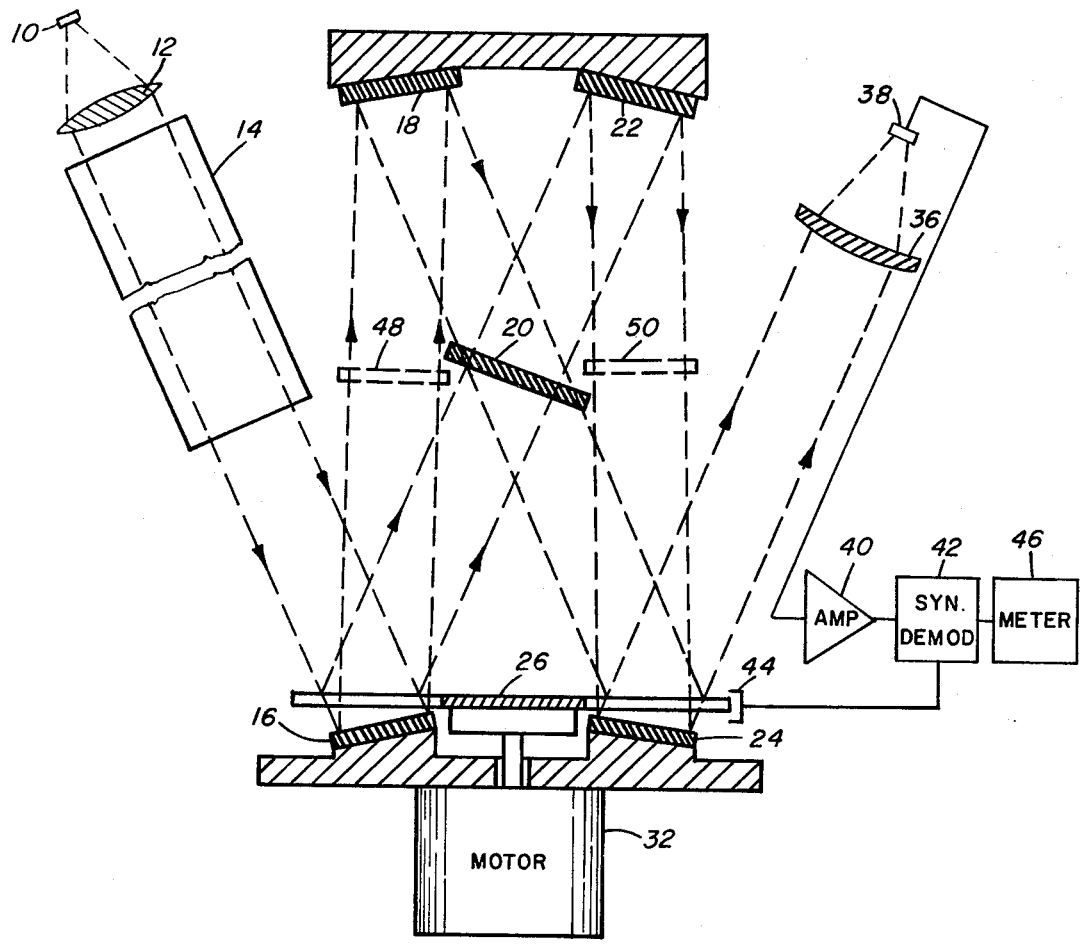
FIG. 1 is an optical and electrical schematic diagram of the spectral analysis instrument embodied in this invention.

In the following description, like elements will be referred to with the same reference numerals. The preferred form of the present invention employs the switching of the angle of incidence on a narrow band pass interference filter. A change of incidence angle from 0° to 45° will cause the band pass of an infrared spike filter to shift approximately 0.3 microns. The shift in band pass with increasing angle of incidence is always toward the shorter wavelength. This phenomenon provides an excellent means for monitoring the slope or derivative of spectral transmission. By rapidly switching the incidence angle of radiation through the filter and detecting its output, the fundamental component of the resulting AC signal will be a measure of the slope, or first derivative, of the transmission curve. By knowing the absorptive characteristics of different materials, the amount of such material in a sample to be analyzed can readily be determined by the amplitude of the output signal derived from the beam switching technique.

Referring now to FIG. 1, a source of radiation 10 is applied by a collimating lens 12 through a sample 14 which contains the material to be analyzed. The only requirement for the source 10 is that it provide radiation which is absorbed by material in the sample, and although most absorption regions will be in the infrared, the invention is not considered limited to the infrared spectral bands. It should be noted that a separate source and sample are not always necessary and in some cases the self-emission of the sample could also serve as the source. An example might be the analyses of hot gases over a furnace. Also, even when a separate source and sample are used, the source need not be an integral part of the instrument, but could be the radiation of a background object. For example, the sun (or moon) could be used as sources for detection of gases in the upper earth's atmosphere.

Figure 2:
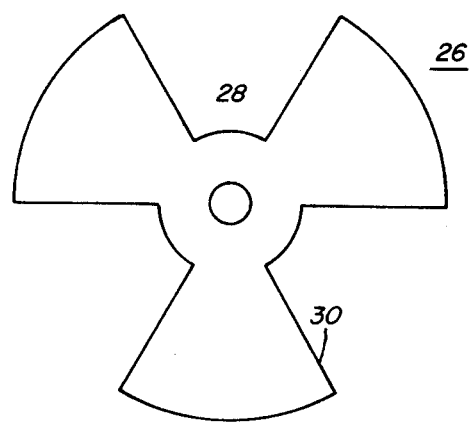
FIG. 2 shows one form of radiation chopper which may be utilized in the present invention.

Collimated radiation from the sample 14 is applied to a beam switching system. The beam switching system is comprised of two cooperating pairs of fixed reflective surfaces 16 and 18, and 22 and 24, respectively. Interposed between the two cooperating pairs of reflecting surfaces is a mirrored radiation chopper 26 which is driven by a motor 32. As will best be seen in FIG. 2, the mirrored chopper 26 has an odd number of alternating reflecting sectors 30 and open sectors 28. A narrow band pass interference filter 20 is placed between the cooperating mirrors or reflective surfaces, such that radiation from or to reflective mirror pairs 16 and 18, and 22 and 24, respectively, pass through said interference filter 20. In the operation of the beam switching device, when a reflecting sector 30 is over mirror 16, an open sector 28 simultaneously appears over the mirror 24. Accordingly, the optical path of radiation from the source 10 through the sample 14 is from the chopper blade 30, filter 20, mirror 22, and mirror 24. The radiation rays pass through the filter 20 at near normal incidence in this path. When the chopper 26 is open over mirror 16, the optical path of the radiation follows through the path of mirror 16, mirror 18, filter 20, and chopper mirrored surface 30. In this path radiation passes through the filter at a 45° angle. The angle is not restricted to 45°, but may be varied by rotating the filter 20.

Radiation from the two above described paths, which are alternately sampled at a high rate, are passed from the beam switching optical system through a lens 36 which focuses the radiation on a radiation detector 38.

The signals developed on the detector 38 are amplified by the amplifier 40 and applied to a synchronous demodulator 42. Simultaneously, a reference generator 44 in cooperation with the chopper 26 derives sync pulses, either magnetically or optically, and applies them to the synchronous demodulator 42. The output of the synchronous demodulator 42 is applied to a meter 46. These are conventional electronic circuits, such as those used in Model IT–4 radiometer manufactured by Barnes Engineering Company, which is the assignee of the present application.

The instrument just described measures the difference in radiance in two spectral regions utilizing a single filter. The filter and cooperating pairs of mirrored surfaces are all fixed, and the angle of incidence of the radiation passed through the filter is switched by a simple rotating mirrored chopper. In the aforesaid instrument it should be noted that the radiation detector 38 has a field of view which does not change, and therefore avoids false signals caused by non-uniformities in the source. The same number of reflections exists in each optical path, and the optical path length is constant, which avoids defocusing and differential atmospheric absorption. It should also be noted that the same area of the filter is used in each optical path, and only a simple rotating chopper is used, which avoids elaborate gear trains, multiphase choppers, or oscillating mechanisms. Once the filter 20 is positioned, it is not moved in the operation. However, by rotating the filter 20 counterclockwise, the spectral shift can be continuously reduced to zero.

An example of a material whose presence and concentration has been measured by the above method is carbon monoxide. CO has a strong absorption band at $4.7\mu$ and becomes very transparent at $5.0\mu$, therefore, the slope of the absorption vs. wavelength curve is very steep in this region. A narrow band pass filter was used which had its center wavelength at $5.0\mu$ and half power points at 4.9 and $5.1\mu$ for radiation at normal incidence. At an angle of incidence of 45° the center wavelength shifts to $4.7\mu$ with half power points at 4.6 and $4.8\mu$. When the angle of incidence is switched between these two values an AC signal results if there is any CO in the path, which is a measure of the slope of the absorption curve between 4.7 and $5.0\mu$ and thus a measure of the concentration of CO. Concentrations as low as 25 ppm have been detected in this manner.

There is a limit on the spectral shift which can be obtained utilizing the arrangement shown in FIG. 1. If a greater shift is necessary, two filters may be used instead of one. As shown in FIG. 1, filter 20 would be replaced with the filters 48 and 50 which are shown in phantom form. Beam switching would still take place, but in this embodiment the incidence angle would not be changed. If several constituents were to be measured from the sample cell, this would be accomplished by merely changing one or both of the filters. In this modification it would not be necessary to use an interference type filter.

An alternative embodiment of the one-filter arrangement employing incidence angle switching is shown in FIG. 3. This arrangement is similar to that shown in FIG. 1, but slightly modified to permit the angle between the two radiation beams to be made smaller. FIG. 3 shows the beam normal to the filter 20 in one path, and the switched beam at a 25° angle. If the filter 20 is rotated, the center wavelength (midpoint between the two spectral regions being examined) can be adjusted without changing the switching angle. Furthermore, the angle can easily be made smaller than 25° if necessary. By making the angle between the two beams smaller, it is much easier to adjust the center wavelength of the filter without elongating the device as shown in FIG. 1.

Another way of adjusting the midpoint between the two spectral regions passed by the instrument would be to tilt the filter 20 in FIG. 1 in the other plane, i.e. away from the normal to the paper. Then the center position and wavelength separation could be adjusted separately using the same element, filter 20, but tilting it in different planes.

In its preferred form, the present invention offers a novel technique for detecting radiation in two spectral regions, utilizing a single filter device by switching the angle of incidence of the optical radiation applied through the filter. This switching is achieved by a very simple radiation chopper device, with the remainder of the optical elements being fixed. This arrangement provides a constant optical path with the same number of reflections, thereby avoiding costly transmission errors. Although not preferred, the novel beam switching arrangement readily adapts itself to a multi-filter arrangement, providing similar advantages of the constant optical path with the equal number of reflections through the system.

Since other modifications, varied to fit particular operating requirements and environments, will be apparent to those skilled in the art, this invention is not considered to be limited to the examples chosen for purposes of disclosure, and covers all changes and modifications which do not constitute departures from the true spirit and scope of this invention.

I claim:

1. A beam switching optical system for spectral analysis of a sample in two spectral bands, comprising
   a. a sample containing matter to be analyzed,
   b. a radiation source for directing a beam of radiation through said sample,
   c. means defining a first optical path of predetermined path length for receiving said beam of radiation from said sample having a first and a second fixed mirror which are spaced in optical alignment,
   d. means defining a second optical path having the same predetermined path length as said first optical path for receiving said beam of radiation from said sample having a third and a fourth fixed mirror which are spaced in optical alignment,
   e. a single narrow band pass filter means positioned to intersect both said first and said second optical paths each of which provides a different angle of incidence for radiation from said sample to said filter means,
   f. beam switching means positioned between said first and second fixed mirrors and said third and fourth fixed mirrors for alternately optically switching said beam of radiation from said sample to said first and second optical paths whereby the angle of incidence of said beam of radiation applied to said filter means is changed to produce therefrom radiation in two spectral regions, and
   g. radiation detector means positioned to receive radiation in two spectral regions at the same angle from said first and second optical paths for producing signals corresponding to the radiation passed by said filter means in said two spectral regions.

2. The beam switching optical system set forth in claim 1 wherein said beam switching means comprises a mirrored radiation chopper having an odd number of alternating reflecting and open sectors with the beam of radiation from said sample being directed thereto whereby said means defining said first and second optical paths including said chopper provide the same number of reflections, the same path length and the same angle of incidence on said radiation detector means from said source to said detector means.

3. The beam switching optical system set forth in claim 2 including a reference signal generator coupled to said radiation chopper, a synchronous demodulator, means coupling said radiation detector means and said reference signal generator to said demodulator for producing an output from said demodulator having an amplitude corresponding to a constituent of the sample being analyzed.

4. The beam switching optical system set forth in claim 1 including means for adjusting the position of said filter means whereby separation of spectral bands of said filter means being adjusted by tilting said filter means in one plane and the band pass of said filter means being adjusted by tilting said filter means in another plane away from said one plane.

* * * * *